US009082407B1

(12) United States Patent (10) Patent No.: US 9,082,407 B1
Faaborg et al. (45) Date of Patent: Jul. 14, 2015

(54) SYSTEMS AND METHODS FOR PROVIDING PROMPTS FOR VOICE COMMANDS

(71) Applicant: Google Inc., Mountain View, CA (US)

(72) Inventors: Alexander James Faaborg, Mountain View, CA (US); Simon Tickner, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/296,936

(22) Filed: Jun. 5, 2014

Related U.S. Application Data

(60) Provisional application No. 61/979,893, filed on Apr. 15, 2014.

(51) Int. Cl.
| | |
|---|---|
| *G10L 13/00* | (2006.01) |
| *G10L 25/00* | (2013.01) |
| *G10L 15/00* | (2013.01) |
| *G10L 15/22* | (2006.01) |
| *G10L 25/48* | (2013.01) |
| *G06F 3/16* | (2006.01) |

(52) U.S. Cl.
CPC .............. *G10L 15/22* (2013.01); *G06F 3/167* (2013.01); *G10L 25/48* (2013.01); *G10L 2015/223* (2013.01)

(58) Field of Classification Search
CPC ......... G10L 15/00; G10L 15/22; G10L 15/26; G10L 15/265; G10L 2015/00; G10L 2015/22; G10L 2015/221; G10L 2015/223; G10L 2015/25; G10L 2015/227; G10L 2015/228; H04M 3/4936

USPC ................ 704/231, 235, 251, 254, 270, 275; 739/88.01
See application file for complete search history.

(56) References Cited

U.S. PATENT DOCUMENTS

| 5,553,121 A * | 9/1996 | Martin et al. ............... 379/88.01 |
|---|---|---|
| 5,592,583 A * | 1/1997 | Sakurai .......................... 704/200 |
| 6,173,266 B1 * | 1/2001 | Marx et al. ..................... 704/270 |
| 6,438,524 B1 * | 8/2002 | Shi ................................. 704/277 |
| 6,937,984 B1 * | 8/2005 | Morgan et al. ................ 704/270 |
| 7,024,366 B1 * | 4/2006 | Deyoe et al. ............... 704/270.1 |
| 7,392,193 B2 * | 6/2008 | Mault ............................ 704/275 |
| 7,436,948 B1 * | 10/2008 | Thenthiruperai ........ 379/266.03 |
| 7,853,448 B2 * | 12/2010 | Narita et al. .................. 704/236 |
| 8,165,884 B2 * | 4/2012 | Sanchez ........................ 704/270 |
| 8,165,886 B1 * | 4/2012 | Gagnon et al. ................ 704/275 |
| 8,355,913 B2 * | 1/2013 | Kiss ............................... 704/235 |
| 8,571,874 B2 * | 10/2013 | Yano ............................. 704/275 |
| 8,762,154 B1 * | 6/2014 | Witt-Ehsani ............... 704/270.1 |
| 8,831,938 B2 * | 9/2014 | Spaulding et al. ............ 704/231 |
| 2002/0042709 A1 * | 4/2002 | Klisch et al. ................. 704/231 |

(Continued)

*Primary Examiner* — Paras D Shah
(74) *Attorney, Agent, or Firm* — Troutman Sanders, LLP; James E. Schutz; Christopher Close, Jr.

(57) ABSTRACT

In an example implementation of the disclosed technology, a method includes setting a command entry timer based on a predetermined command entry threshold. The method also includes receiving an indication of user input to prompt receipt of an audio command and, responsive to determining that the command entry timer has expired since receiving the indication of user input, outputting, for display, at least one indicator associated with at least one supported audio command that is associated with at least one function of the computing device. The method also includes receiving a plurality of audio input samples and updating the command entry threshold based on plurality of audio input samples.

26 Claims, 7 Drawing Sheets

(56) References Cited

U.S. PATENT DOCUMENTS

| | | | |
|---|---|---|---|
| 2005/0238145 A1* | 10/2005 | Knott et al. | 379/88.01 |
| 2006/0111902 A1* | 5/2006 | Julia et al. | 704/236 |
| 2007/0033053 A1* | 2/2007 | Kronenberg et al. | 704/275 |
| 2009/0061407 A1* | 3/2009 | Keim | 434/322 |
| 2011/0191109 A1* | 8/2011 | Harma | 704/275 |
| 2012/0089392 A1* | 4/2012 | Larco et al. | 704/231 |
| 2013/0090930 A1* | 4/2013 | Monson et al. | 704/275 |
| 2014/0074481 A1* | 3/2014 | Newman | 704/275 |
| 2014/0278444 A1* | 9/2014 | Larson et al. | 704/275 |
| 2014/0297287 A1* | 10/2014 | Newman | 704/275 |
| 2015/0039317 A1* | 2/2015 | Klein et al. | 704/275 |

* cited by examiner

SYSTEMS AND METHODS FOR PROVIDING PROMPTS FOR VOICE COMMANDS

BACKGROUND

Computing devices may perform certain functions in response to audio commands indicated by user speech. To provide this functionality, a computing device may include or be operatively coupled to an audio input device such as a microphone. In some known scenarios, a computing device may analyze audio input received from a user (e.g., via a microphone) to infer an audio command indicated by the audio input and, in response, interrupt the user by outputting an audio indication of the audio command. Such an interruption can be distracting or frustrating to the user, however. In alternative scenarios, the computing device may maintain the microphone in a constant, active listening state until an audio command is received, but this feature may impose a significant drain on the computing device's battery. Further, as the set of possible audio commands interpretable by the computing device can be difficult for users to discover, users may be forced to rely on memory when attempting to utilize such audio command functionality, thus making such functionality difficult to use and of limited utility to the user.

SUMMARY

Some or all of the above needs may be addressed by certain implementations of the disclosed technology. Certain implementations may include methods, systems, and non-transitory computer-readable medium for setting, by a computing device, a command entry timer based on a predetermined command entry threshold. Further, implementations may include methods, systems, and non-transitory computer-readable medium for receiving, by the computing device, an indication of user input to prompt receipt of an audio command and, responsive to determining that that the command entry timer has expired since receiving the indication of user input, outputting, for display, at least one indicator associated with at least one supported audio command that is associated with at least one function of the computing device.

According to an example implementation, a method is provided. The method includes setting, by a computing device, a command entry timer based on a predetermined command entry threshold. The method further includes receiving, by the computing device, an indication of user input to prompt receipt of an audio command and, responsive to determining that the command entry timer has expired since receiving the indication of user input, outputting, for display, at least one indicator associated with at least one supported audio command that is associated with at least one function of the computing device. The method further includes receiving, at the computing device, a plurality of audio input samples and updating, by the computing device, the command entry time threshold based on the plurality of audio input samples.

According to other example implementations, a system is provided. The system includes one or more processors and a memory coupled to the one or more processors. The memory stores instructions that, when executed by the one or more processors, cause the system to set a command entry timer and receive an indication of user input to prompt receipt of an audio command. Further, the instructions, when executed by the one or more processors, cause the system to, responsive to determining that the command entry timer has expired since receiving the indication of user input, output, for display, at least one indicator associated with at least one supported audio command that is associated with at least one function of the computing device. Further, the instructions, when executed by the one or more processors, cause the system to receive a plurality of audio input samples and update the command entry time threshold based on the plurality of audio input samples.

According to another example implementation, a non-transitory computer-readable medium is provided. The computer-readable medium stores instructions that, when executed by one or more processors, cause a computing device to set a command entry timer and receive indication of a user input to prompt receipt of audio command. Further, the instructions, when executed by the one or more processors, cause the computing device to, responsive to determining that the command entry timer has expired since receiving the indication of the user input, output, for display, at least one indicator associated with at least one supported audio command that is associated with at least one function of the computing device. Further, the instructions, when executed by the one or more processors, cause the computing device to receive a plurality of audio input samples and update the command entry time threshold based on the plurality of audio input samples.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
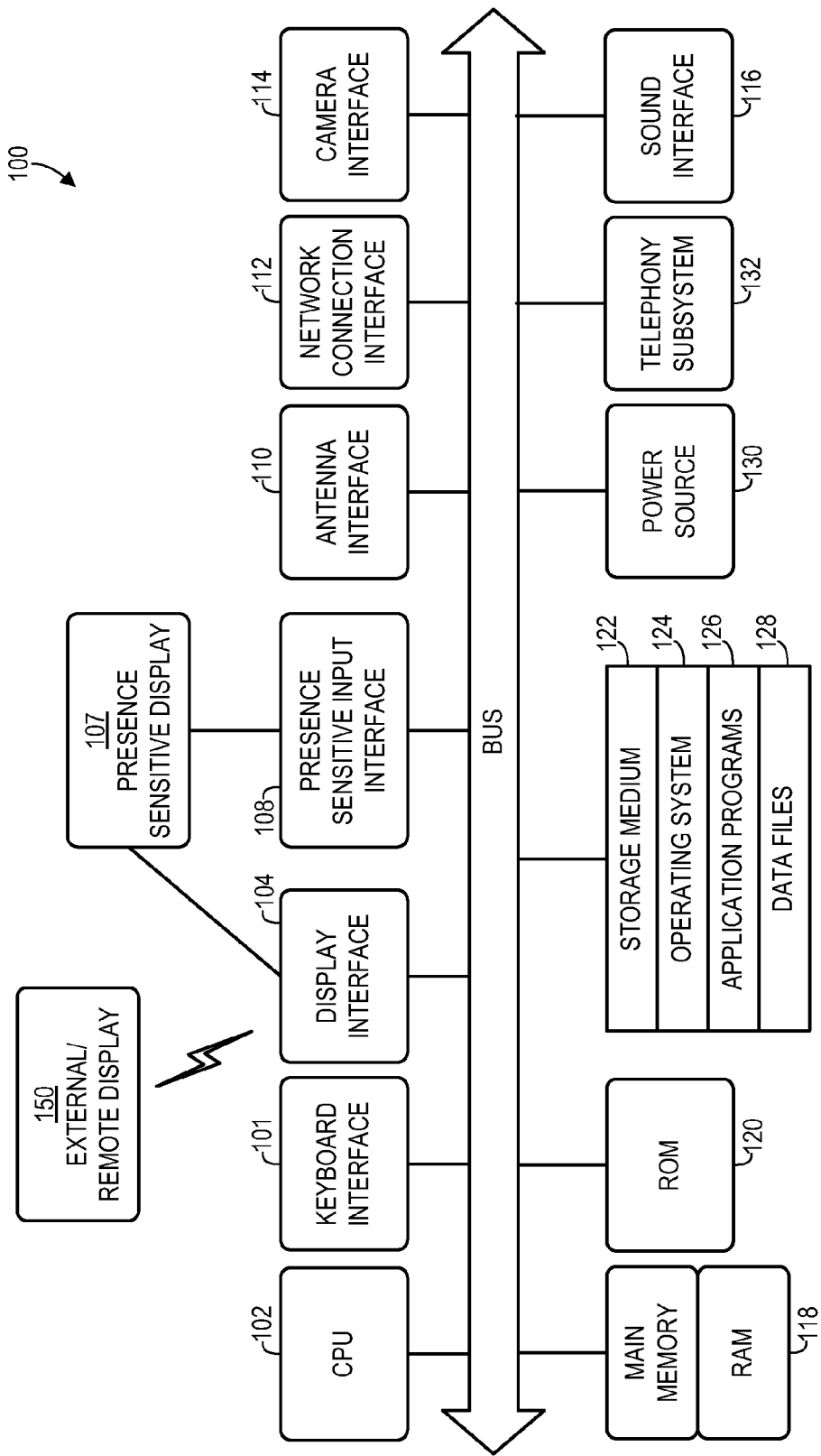
FIG. 1 is a block diagram of an illustrative computer system architecture 100, according to an example implementation.

In certain implementations of the disclosed technology, a computing device, in response to receiving an indication of user input to prompt receipt of an audio command and responsive to determining that a command entry timer has expired (i.e., that a predetermined amount of time has passed since receiving the indication), may output, for display, at least one indicator associated with at least one audio or voice command.

In an example implementation, a computing device may receive an indication of user input to prompt receipt, by the computing device, of an audio command (e.g., a voice command). In some implementations, user input may be a gesture (e.g., a touch gesture) by one or more input objects (e.g., one or more fingers or a stylus) placed at a presence-sensitive input device associated with the computing device. The gesture may include holding of an input object at a particular location of the presence-sensitive input device for a predetermined period of time (to perform, e.g., a press-and-hold gesture). User input may also be the speaking of a predefined word, sound, or phrase. In response to receipt of an indication of user input to prompt receipt of an audio command, the computing device may activate an audio input device (such as a microphone included in or operatively coupled to the computing device) to receive the audio command. The audio input device may be a microphone included in or operatively coupled to the computing device.

In some implementations, after the computing device receives the indication, the computing device may be configured to "listen" for receipt of an audio command from the user until a command entry timer expires. If the user does not begin speaking (i.e., fails to provide an audio command) before the expiration of the command entry timer, the computing device may provide one or more visual indicators associated with one or more supported audio or voice commands. Audio commands (e.g., voice commands) may be associated with applications, or functions or features of an application, that are executable on or in conjunction with the computing device and/or various operating system functions. The indicators associated with the audio commands may be any combination of words, phrases, pictures, and/or graphical icons that serve as cues ("cue cards") or prompts to identify certain valid audio commands to the user (i.e., audio commands that are recognized and supported by the computing device).

In some implementations, a computing device may be configured to output, for display, certain indicators based on contextual factors such as time of day and/or geolocation of the computing device. The context may be determined based on one or more particular applications executing on the computing device at the time the computing device receives the indication of user input. The computing device may further be configured to output, for display, indicators based on the user's historical usage. For example, the computing device may be configured to output, for display, indicators associated with supported audio commands the user has recently utilized. Further, the computing device may be configured to output, for display, indicators associated with applications the user has recently utilized (i.e., based on the recency of an application's use). In example implementations, the computing device may be configured to output, for display, indicators associated with one or more applications irrespective of whether the user has accessed the application using a supported audio command.

In some implementations, a computing device may be configured to output indicators, for display, such that they are ranked according to, for example, the frequency with which a user has used a particular application or function associated with a particular indicator. Further yet, a computing device may be configured to output indicators, for display, that are associated with voice commands the user has not yet utilized in an effort to educate the user as to voice commands with which the user may not be familiar.

In some implementations, the computing device can set the command entry timer described above based on a predetermined command entry threshold. Further, in some implementations, the computing device may be configured to update the command entry threshold timer. For example, in some implementations, the computing device may receive a plurality of audio input samples (e.g., audio commands) from a user. These audio input samples may comprise speech (i.e., spoken or mumbled words, as well as pauses such as, e.g., um, ah, uh), static, and/or silence. In example implementations, a computing device may be configured to determine information based on analysis of the audio input samples, which may include a user's identified speech pattern. In some implementations, the computing device may analyze the audio input samples and determine a user's identified speech pattern (i.e., speech behavior or typical speech pattern) based on the analysis. Likewise, another available processor associated with the computing device or a remote processing device (e.g., cloud processor) associated with the computing device may analyze the audio input samples and determine the speech behavior. In example implementations, determining the speech behavior may comprise the computing device receiving identified speech behavior from an associated processor or remote processing device. Based on the determined speech behavior, the computing device may be configured to adjust or update the command entry time threshold such that it is customized to the user.

In example implementations, the analysis or determined speech behavior or speech pattern may comprise a delay time. In some implementations, a delay time may reflect or be based on the amount of time before the computing device or an associated processor detects decipherable speech in an audio input sample. In other words, a delay time may reflect the amount of time the user typically takes to begin speaking (i.e., provide an audio command) after the computing device receives an indication of user input to prompt receipt of an audio command. Also, in some implementations, the delay time may reflect or be based on the amount of time the computing device detects between periods of decipherable speech. Put differently, the delay time may reflect or be based on the length of pauses a user takes between words or syllables while providing an audio command. As will be appreciated, certain users may take a longer pause between, e.g., speaking a predefined word (i.e., providing a user input to prompt the computing device to receive an audio command) and actually providing an audio command. Further, when entering or providing an audio command, certain users may speak more slowly or quickly than others (e.g., because of a regional dialect). When entering audio commands, some users may carefully annunciate or articulate their words while others may run words together or speak in short, choppy bursts of words. As will be appreciated, by configuring the command entry time threshold based on a user's speech behavior or typical speech pattern and outputting indicators upon expiration of the customized command entry timer, the indicators may be less likely to interrupt, distract, or frustrate the user because the user likely needs the assistance of the cue cards (i.e., visual indicators).

In some implementations, the computing device may compare the user's delay time to a predetermined reference delay time, which may be determined based on analysis of a plurality of input samples from a plurality of users. As will be appreciated, such a reference delay time may represent an average amount of time users typically take to begin speaking and/or the average pause length a user takes when speaking. In some implementations, the computing device may determine a user's average delay time (i.e., mean delay time) based on a plurality of input samples from the user. The computing device may then compare the user's mean delay time to a reference delay time and/or the user's historical or previous delay times. The computing device may likewise be configured to adjust or update the command entry time threshold by a predetermined amount of time or a variable amount of time based on the difference between the user's delay time and the reference delay time.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example implementations of the disclosed technology will now be described with reference to the accompanying figures.

As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a central processing unit (CPU) 102, where computer instructions are processed; a display interface 104 that acts as a communication interface and provides functions for rendering video, graphics, images, and texts on the display. In certain example implementations of the disclosed technology, the display interface 104 may be directly connected to a local display, such as a touch-screen display associated with a mobile computing device. In another example implementation, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 104 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 104 may be operatively coupled to a local display, such as a touch-screen display associated with a mobile device. In another example, the display interface 104 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 104 may wirelessly communicate, for example, via the network connection interface 112 such as a Wi-Fi transceiver to the external/remote display.

The computing device architecture 100 may include a keyboard interface 106 that provides a communication interface to a keyboard. In one example implementation, the computing device architecture 100 may include a presence-sensitive display interface 108 for connecting to a presence-sensitive display 107. According to certain example implementations of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 108, network connection interface 112, camera interface 114, sound interface 116, etc.,) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. As mentioned above, the display interface 104 may be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components.

According to an example implementation, the computing device architecture 100 includes and a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 128 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example embodiment, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

FIG. 2 illustrates a mobile computing device 200 according to an example implementation of the disclosed technology, which may include some or all of the components of the computing device 100 shown in FIG. 1. The mobile computing device 200 comprises an audio input device 210, such as a microphone, for receiving audio or voice commands. The mobile computing device 200 may be configured to receive an indication of user input to prompt receipt, by the computing device 200, of an audio or voice command. In one implementation, the indication of user input may be comprise a user's selection of an object or icon 204 that may be output for display on a display screen 202. In the example implementation shown, the display screen 202 is a presence-sensitive input device, and in particular a touchscreen. The mobile computing device 200 may be configured to, in response to receiving an indication of user input to prompt receipt of an audio command (e.g., selection of an object 204 that indicates a request to enter a voice command), initialize an audio input device 210, such as a microphone, to receive a user's audio commands. In example implementations, prior to receipt of an indication of user input to prompt receipt of audio commands, the mobile computing device 200 may set a command entry timer, which may be based on a predetermined command entry threshold.

In one implementation, the audio input device 210 remains inactive until it is initialized. In one implementation, the audio input device 210 is configured such that it maintains limited functionality. For example, the mobile computing device 200 may be configured such that receipt of certain predetermined words or phrases (i.e., user inputs), which may indicate a user's intention or desire to provide an audio command, prompts initialization of the audio input device 210, by the computing device 200, such that the audio input device 210 is fully active for receipt of the audio command. In yet another implementation, the audio input device 210 remains active at all times such that a user can provide an audio command (e.g., voice command) at any time.

In example implementations, after receiving an indication of user input to prompt receipt of audio commands (e.g., through a user selecting an icon 204 or via a user speaking certain predetermined words or phrases), the mobile computing device 200 may be configured to wait a predetermined period of time to receive voice or audio commands from the user. In example implementations, if the predetermined time period expires and no valid (i.e., recognized or supported) audio commands are received, the mobile computing device 200 may be configured to output, for display, one or more indicators associated with valid audio commands. In one implementation, the one or more indicators may be displayed as a list of valid voice commands 220A, as shown in FIG. 2B.

For example, a user may speak a particular word or phrase indicating a desire to provide a voice command to access or utilize a particular application of the mobile computing device 200. After speaking the word or phrase, however, the user may forget the valid voice command required to access the desired application. In such a case, after the predetermined period of time expires, the mobile computing device 200 may be configured to output, for display, a list of valid audio commands 220A, which can serve as cues ("cue cards") or reminders to the user as to what commands are available. In another example, after providing an appropriate user input, a user may begin providing a voice command and then lose his or her train of thought before completing the command. In example implementations, after the predetermined time period expires, the computing device may be configured to output, for display, a list of valid voice commands 220A, which may refresh the user's memory.

Figure 2A:
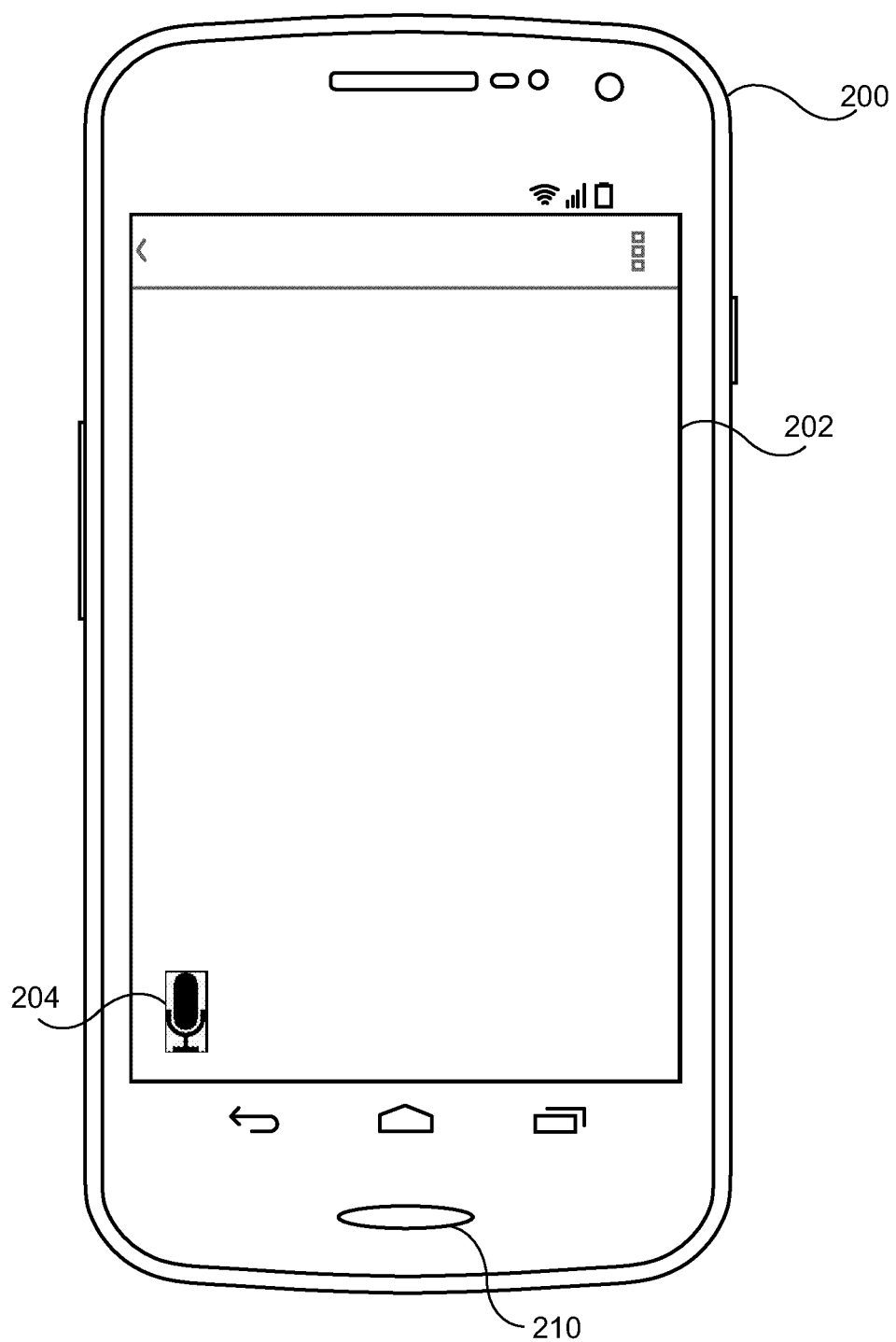
FIG. 2A illustrates a computing device 200, according to an example implementation.
Figure 2B:
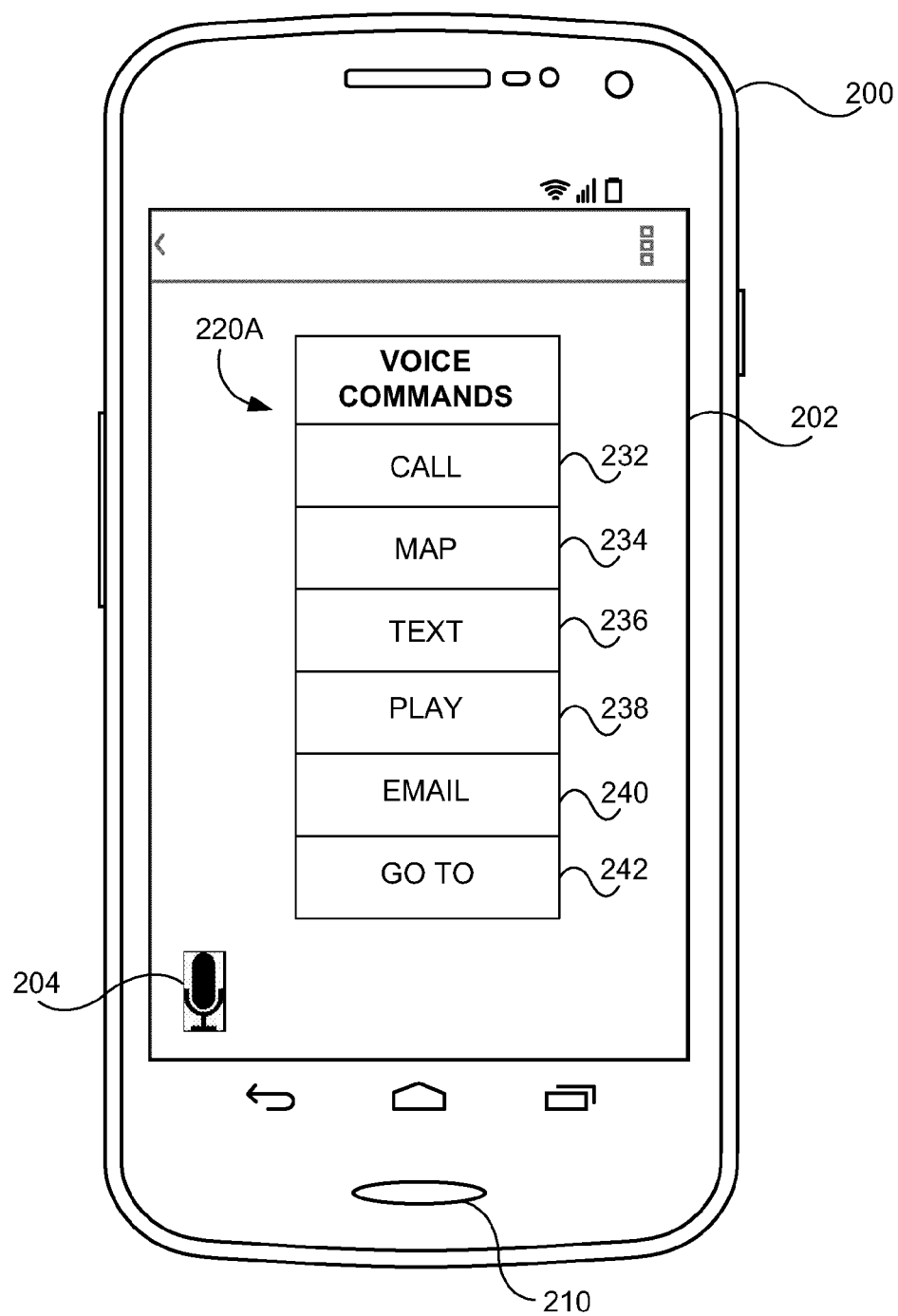
FIG. 2B illustrates the computing device 200 with a list of valid voice commands 220A that are output for display, according to an example implementation.

As discussed and as shown in FIG. 2B, the displayed list of valid audio commands 220A may serve as cues for the user. For example, as shown in FIG. 2B, the list 220A may comprise voice commands such as "CALL" 232, which may allow the user to initiate a phone call, or "MAP" 234, which may allow the user to access a map application to view one or more nearby locations (e.g., a park, a university, movie theaters, hospitals, coffee shops). The list of valid audio commands 220A may further comprise a "TEXT" command 236, which may allow the user to initiate composing a text message, or a "PLAY" command 238, which may allow the user to play, for example, a song, podcast, voicemail message, etc. Additionally, the list of available commands 220A may further comprise voice commands such as "EMAIL" 240, which may allow the user to initiate the drafting of an email message, or "GO TO" 242, which may allow the user to request access to a website.

Though not shown in the list of valid audio commands 220A, additional valid audio commands (e.g., voice commands) may allow a user to initiate voice-guided navigation, dictate a "note to self" message, look up the definition of a particular term, search for contact information, access or open a particular application on the mobile computing device 200, check the user's schedule and/or add a task or event to the user's schedule, check sports scores, check the weather forecast, find out the title of a song, or various other actions that would occur to one of ordinary skill Additionally, it will be understood by one of ordinary skill that the list of valid audio commands (e.g., 220A) may comprise a single command or a plurality of commands, as may be appropriate.

In one implementation, the mobile computing device 200 or an application executed by the mobile computing device 200 may intelligently determine the various audio commands and the order in which the audio commands are shown in the list of valid voice commands 220A. For example, the list of available voice commands 220A may comprise the voice commands that are most-frequently utilized by the user. Further, the order of the commands in the list of available voice commands 220A may be presented based on their frequency of use by the user. For example, the command the user utilizes most frequently may appear at the top of the list or, alternatively, in the middle of the list, which may be considered to be most visible location.

In one implementation, the computing device 200 may be configured to display audio commands in the list of valid audio commands 220A based on the time of day. For example, during typical working hours, the list of available voice commands 220A may comprise various work-related commands that, for example, allow a user to initiate the drafting of an email, search for contact information, check the user's schedule and/or schedule a new event or task. Alternatively, on the weekend, the list of available commands 220A may comprise commands unrelated to work such as those that allow the user to, for example, play a song or check sports scores.

In one implementation, the computing device 200 may be configured to display audio commands in the list of valid audio commands 220A based on the user's current location. For example, based on received GPS information, the mobile computing device 200 may determine the user is attending a meeting. Accordingly, the computing device 200 may be configured to display commands that may comprise various work-related commands, as discussed previously. In one implementation, the list of available voice commands 220A may relate more specifically to the meeting itself. For example, the mobile computing device 200 may be configured to access information from the user's calendar to determine the meeting's attendees and, based on that information, the list of available voice commands 220A may include an option to initiate the drafting of an email message to each of the attendees. In another example, based on received GPS data or other information, the mobile computing device 200 may be configured to determine that the user is at a particular museum. In such a situation, the list of available voice commands 220A may include an option to access floor plans or maps of the museum or information relating to exhibits at the museum, for example, an option to capture an image (i.e., take a picture) of an exhibit or object and then conduct an internet image search for information relating to the object or exhibit.

In one implementation, the computing device 200 may be configured to display audio commands in the list of valid audio commands 220A based on information received or acquired from an accelerometer operatively connected to the mobile computing device 200. For example, information acquired from an accelerometer may indicate a user is exercising. If the user then provides user input indicating a request to enter a voice command, a list of available voice commands 220A may comprise commands for accessing various exercise-related applications, and/or for playing music or podcasts. In another example, information acquired from an accelerometer may indicate the user is in the car, and in such case, the list of available voice commands 220A may comprise various travel-related voice commands (e.g., for accessing maps or for initiating voice-guided navigation).

Figure 2C:
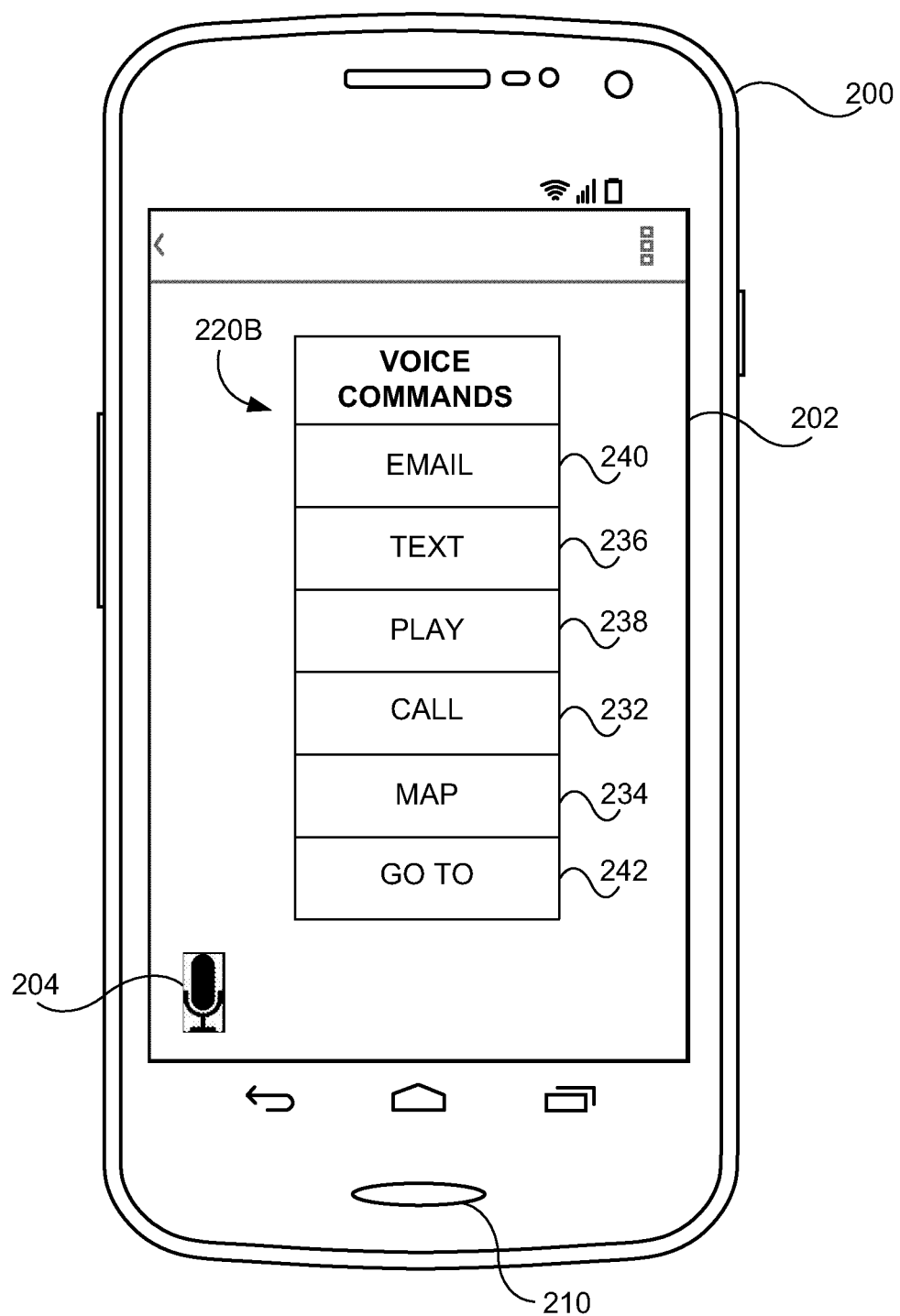
FIG. 2C illustrates the computing device 200 with a reconfigured list of valid voice commands 220B, according to an example implementation.

In one implementation, as shown in FIG. 2C, the computing device 200 may be configured to display audio commands shown in the list of valid audio commands 220B based on the user's most recent actions on the mobile computing device 200, which may or may not have been initiated by a voice command. For example, if the user has used the mobile computing device 200 to, in order of recency, send an email, send a text message, play a song, make a phone call, map a location, and access a website, the list of available voice commands 220B may be displayed as shown in FIG. 2C.

Figure 2D:
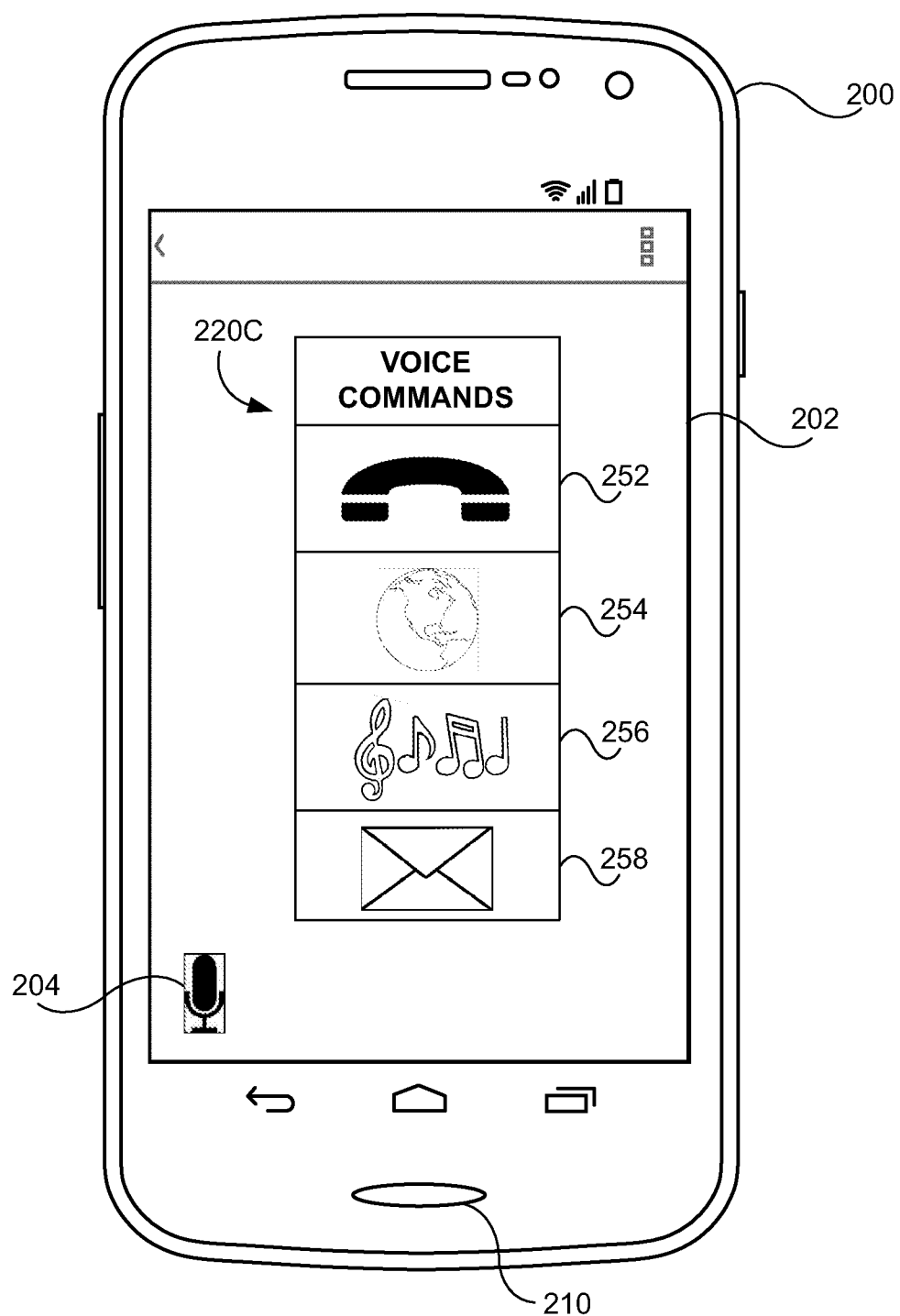
FIG. 2D illustrates the computing device 200 with a list of valid audio voice commands 220C represented by graphical icons that are output for display, according to an example implementation.

In one implementation, as shown in FIG. 2D, the audio commands shown in the list of valid audio commands 220C may be represented by graphical icons or images that may serve as a visual cue to the user. For example, an icon of a telephone 252 may be associated with a voice command that allows the user to initiate a phone call. An icon of a globe 254 may be associated with a voice command that allows a user to access a visual map of nearby locations. An icon of musical notes 256 may be associated with a voice command that allows a user to play a song. An envelope icon 258 may be associated with a voice command that allows a user to initiate the drafting of an email.

It should be appreciated that the voice commands illustrated in the lists of available voice commands 220A and 220B and the sample icons illustrated in the list of available voice commands 220C are not limited to the specific commands or icons shown. The sample voice commands and icons illustrated in the list of available voice commands 220A, 220B, and 220C are further not limited to a certain number or type of supported voice commands or various corresponding functions and are not limited to the specific commands discussed.

Figure 3:
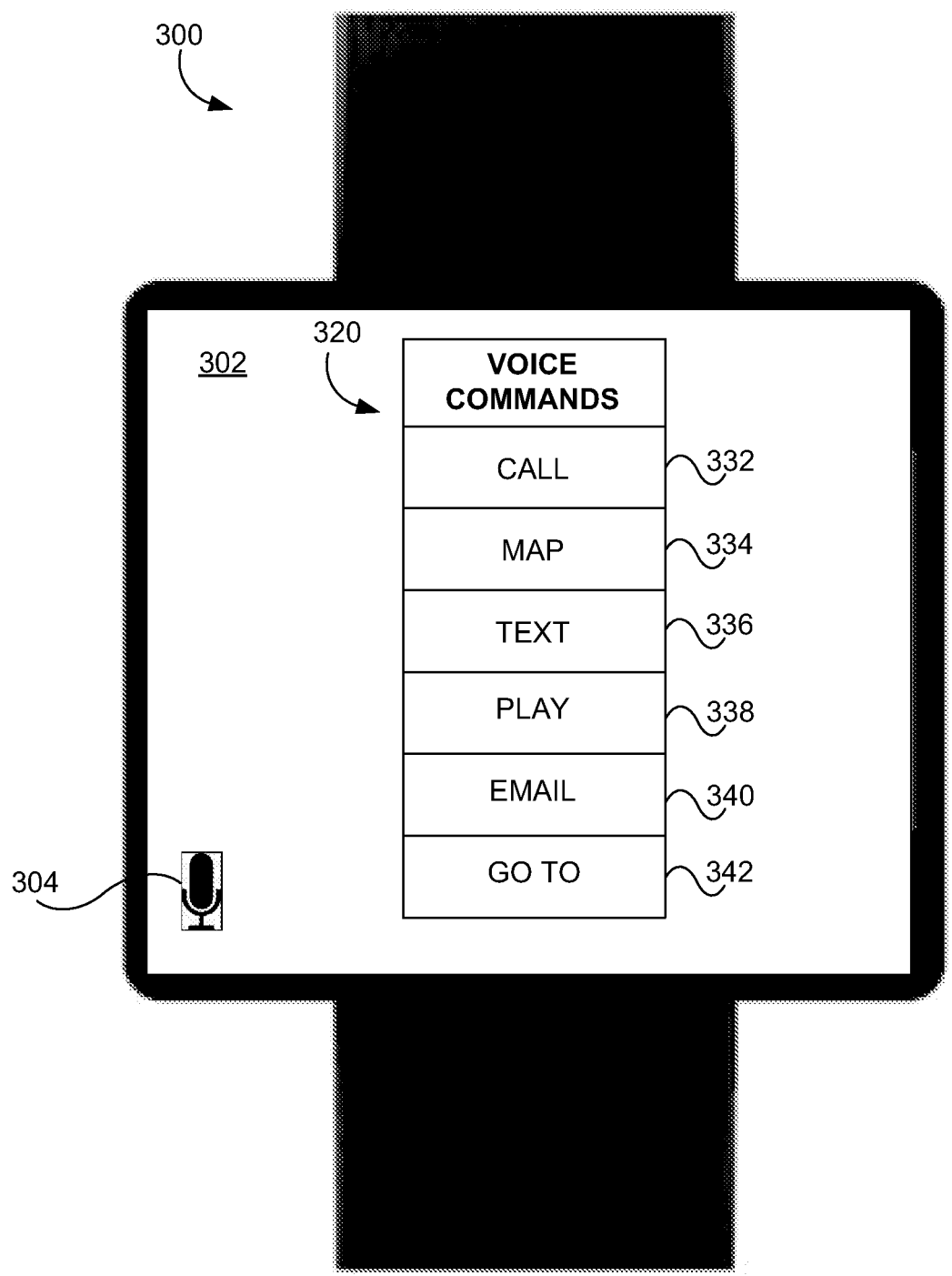
FIG. 3 illustrates a smart watch 300 with a list of valid voice commands 320 that are output for display, according to an example implementation.

FIG. 3 illustrates a smart watch 300 according to an example implementation of the disclosed technology, which may include some or all of the components of the computing device 100 shown in FIG. 1. As illustrated in FIG. 3, in one implementation, a smart watch 300 may comprise a display screen 302 and be configured to receive voice commands. An icon representing a microphone 304 may be displayed on the display screen 302 to indicate to the user that the smart watch 300 is configured to receive audio commands (e.g., voice commands). Further, in one implementation, the smart watch 300 may be configured to output, for display, a list of valid audio commands 320 for display on display screen 302. Similar to the functionality discussed in relation to FIG. 2B, the list of valid audio commands 320 may comprise audio commands such as "CALL" 332, which may allow the user to initiate a phone call, or "MAP" 334, which may allow the user access a visual map of a nearby location or locations (e.g., a park, a university, movie theaters, hospitals, coffee shops). The list of valid audio commands 320 may further comprise a "TEXT" command 336, which may allow the user to initiate composing a text message, or a "PLAY" command 338, which may allow the user to play, for example, a song, podcast, and/or voicemail message. The list of valid audio commands 320 may further comprise audio commands such as "EMAIL" 240, which may allow the user to initiate the drafting of an email message, or "GO TO" 242, which may allow the user to request access to a website.

Figure 4:
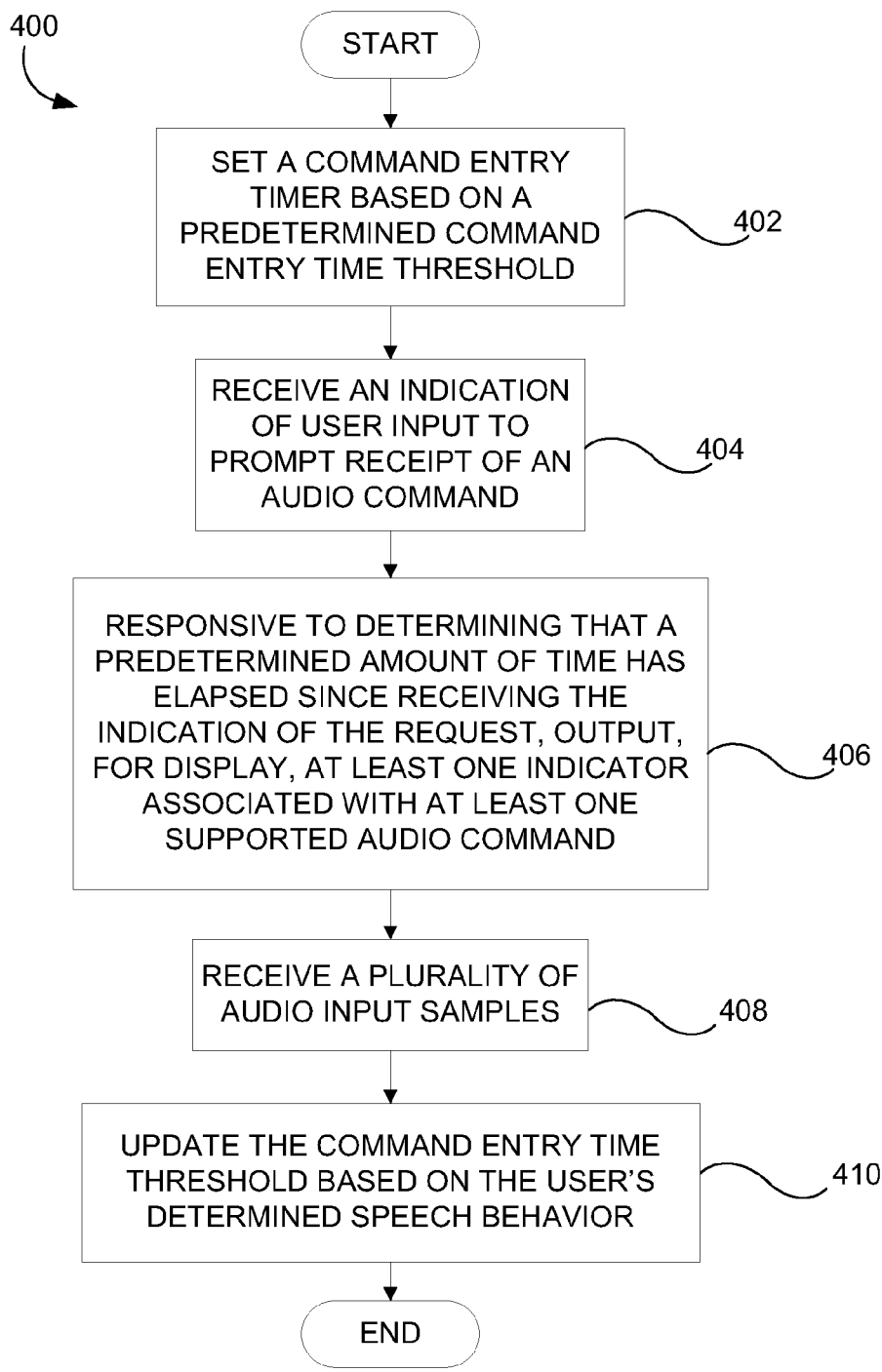
FIG. 4 is a flow diagram of a method 400 according to an example implementation.

FIG. 4 is a flow diagram of a method 400 according to an example implementation of the disclosed technology. The method 400 begins at block 402, where a computing device sets a command entry timer. In example implementations, the command entry timer may set based on a predetermined command entry threshold (i.e., the amount of time a user has to input an audio command after the user begins speaking). At block 404, the computing device receives an indication of a user input to prompt receipt of an audio or voice command. At block 406, in response to determining that a predetermined amount of time has elapsed since receiving the indication of user input, the computing device outputs for display at least one indicator associated with at least one supported audio or voice command. At block 408, the computing device receives a plurality of audio input samples. In example implementations, audio input samples may comprise spoken audio (e.g., spoken or mumbled words, pauses, silence, and static). In some implementations, certain audio may be decipherable audio (such as spoken words), while other audio may be undecipherable (such as, for example, mumbled or stuttered words). At block 410, the computing device updates the command entry time threshold based on the user's determined speech behavior. The method 400 ends following block 410.

Outputting the at least one indicator associated with at least one supported voice command may include outputting, by the computing device, for display, the indicator in the form of a visual cue or cue card to the display of the computing device. In an example implementation, the visual cue or cue card may take the form of a word or phrase associated with a supported voice or audio command. In another example implementation, the visual cue or cue card may take the form of a graphical icon associated with a supported command. Supported voice or audio commands may be associated with functions or features of an application that are executable on the computing device and/or various operating system functions.

As discussed, the predetermined command entry threshold may be configured for or adaptable to a particular user. In an example implementation, the computing device may be configured to adapt the predetermined amount of time according to a user's speech patterns. For example, the computing device may be configured to determine how much time a user typically takes to begin speaking or resume speaking after a pause.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person of ordinary skill to practice certain implementations of the disclosed technology, including making and using any devices or systems and performing any incorporated methods. The patentable scope of certain implementations of the disclosed technology is defined in the claims, and may include other examples that occur to those of ordinary skill Such other examples are intended to be within the scope of the claims if they have structural elements that do not differ from the literal language of the claims, or if they include equivalent structural elements with insubstantial differences from the literal language of the claims.

What is claimed is:

1. A method, comprising:
   setting, by a computing device, a time threshold, the time threshold indicating a predetermined amount of time;
   receiving, by the computing device, an indication of user input to prompt the computing device to detect a plurality of audio samples;
   responsive to determining that the predetermined amount of time has elapsed and that the computing device has received no audio command executable by the computing device since receipt of the indication of user input, outputting, for display, an indicator associated with at least one audio command executable by the computing device;
   receiving, at the computing device, the plurality of audio samples;
   generating, at the computing device and based on the plurality of audio samples, information indicative of a speech pattern of the user, the information indicative of the speech pattern of the user being based on lengths of pauses between words detected in the plurality of audio samples; and
   updating, by the computing device and based on the information indicative of the speech pattern of the user, the predetermined amount of time indicated by the time threshold.

2. The method of claim 1, wherein information indicative of the speech pattern of the user is computing device information indicative of the speech pattern of the user, the method further comprising:
   receiving, from a remote processing device and based on the plurality of audio samples, remote processing device information indicative of the speech pattern of the user.

3. The method of claim 1, wherein the information indicative of the speech pattern of the user is further based on lengths of pauses between syllables detected in the plurality of audio samples.

4. The method of claim 1, wherein the information indicative of the speech pattern of the user is further based on an amount of time before decipherable speech is detected in the plurality of audio samples.

5. The method of claim 3, wherein updating, by the computing device and based on the information indicative of speech pattern of the user, the predetermined amount of time indicated by the time threshold further comprises:
   comparing the delay time to a predetermined reference delay time;
   responsive to determining that the delay time exceeds the predetermined reference delay time by a predetermined factor, increasing the predetermined amount of time indicated by the time threshold; and
   responsive to determining that the predetermined reference delay time exceeds the delay time by the predetermined factor, decreasing the predetermined amount of time indicated by the time threshold.

6. The method of claim 5, wherein the predetermined reference delay time is determined from a plurality of audio samples from a plurality of users.

7. The method of claim 5, wherein the delay time is a mean delay time, and the mean delay time is calculated by taking the mean of a plurality of delay times from the plurality of audio samples.

8. The method of claim 1, wherein the at least one indicator is associated with at least one of a word, a phrase, a graphical icon, and a picture.

9. The method of claim 1, wherein the at least one indicator is determined, by the computing device, based on at least one of a time of day, a geolocation of the computing device, a recency of use by a user of an application associated with the indicator, and a frequency of use by the user of an application associated with the indicator.

10. The method of claim 1, wherein user input to prompt the computing device to detect a plurality of audio samples comprises at least one of a press-and-hold gesture, a spoken predefined word, a spoken predefined sound, and a spoken predefined phrase.

11. The method of claim 1, wherein information indicative of a speech pattern of the user is indicative of a regional dialect.

12. A system, comprising:
    one or more processors;

a memory coupled to the one or more processors and storing instructions that, when executed by the one or more processors, cause the system to:
- set a time threshold, the time threshold indicating a predetermined amount of time;
- receive an indication of user input to prompt the system to detect a plurality of audio samples;
- responsive to determining that the predetermined amount of time has elapsed and that the system has received no audio command executable by the system since receipt of the indication of user input, output, for display, an indicator associated with at least one audio command executable by the system;
- receive the plurality of audio samples;
- generate, based on the plurality of audio samples, information indicative of a speech pattern of the user, the information indicative of the speech pattern of the user being based on lengths of pauses between words detected in the plurality of audio samples; and
- update, based on the information indicative of the speech pattern of the user, the predetermined amount of time indicated by the time threshold.

13. The system of claim 12, wherein information indicative of the speech pattern of the user is system information indicative of a speech pattern of the user, and wherein the memory further stores instructions that, when executed by the one or more processors, cause the system to:
receive, from a remote processing device and based on the plurality of audio samples, remote processing device information indicative of the speech pattern of the user.

14. The system of claim 12, wherein the information indicative of the speech pattern of the user is further based on lengths of pauses between syllables detected in the plurality of audio samples.

15. The system of claim 12, wherein the information indicative of the speech pattern of the user is further based on an amount of time before decipherable speech is detected in the plurality of audio samples.

16. The system of claim 14, wherein updating, based on the information indicative of the speech pattern of the user, the predetermined amount of time indicated by the time threshold further comprises:
- comparing the delay time to a predetermined reference delay time;
- responsive to determining that the delay time exceeds the predetermined reference delay time by a predetermined factor, increasing the predetermined amount of time indicated by the time threshold; and
- responsive to determining that the predetermined reference delay time delay time exceeds the delay time by the predetermined factor, decreasing the predetermined amount of time indicated by the time threshold.

17. The system of claim 16, wherein the predetermined reference delay time is determined from a plurality of audio samples from a plurality of users.

18. The system of claim 16, wherein the delay time is a mean delay time, and the mean delay time is calculated by taking the mean of a plurality of delay times from the plurality of audio samples.

19. A non-transitory computer-readable medium storing instructions that, when executed by one or more processors, cause a computing device to:
- set a time threshold, the time threshold indicating a predetermined amount of time;
- receive an indication of user input to prompt the computing device to detect a plurality of audio samples;
- responsive to determining that the predetermined amount of time has elapsed and that the computing device has received no audio command executable by the computing device since receipt of the indication of user input, output, for display, an indicator associated with at least one audio command executable by the computing device;
- receive the plurality of audio samples;
- generate, based on the plurality of audio samples, information indicative of the speech pattern of the user, the information indicative of the speech pattern of the user being based on lengths of pauses between words detected in the plurality of audio samples; and
- update, based on the information indicative of the speech pattern of the user, the predetermined amount of time indicated by the time threshold.

20. The non-transitory computer-readable medium of claim 19, wherein
information indicative of the speech pattern of the user is computing device information indicative of the speech pattern of the user, and wherein the non-transitory computer readable medium further stores instructions that, when executed by the one or more processors, further cause the computing device to:
receive, from a remote processing device and based on the plurality of audio samples, remote processing device information indicative of the speech pattern of the user.

21. The non-transitory computer-readable medium of claim 19, wherein the information indicative of the speech pattern of the user is further based on an amount of time before decipherable speech is detected in the plurality of audio samples.

22. The non-transitory computer-readable medium of claim 19, wherein the information indicative of the speech pattern of the user is further based on lengths of pauses between syllables detected in the plurality of audio samples.

23. The non-transitory computer-readable medium of claim 19, wherein updating, based on the information indicative of the speech pattern of the user, the predetermined amount of time indicated by the time threshold further comprises:
- comparing the delay time to a predetermined reference delay time;
- responsive to determining that the delay time exceeds the predetermined reference delay time by a predetermined factor, increasing the predetermined amount of time indicated by the time threshold; and
- responsive to determining that the predetermined reference delay time delay time exceeds the delay time by the predetermined factor, decreasing the predetermined amount of time indicated by the time threshold.

24. The non-transitory computer-readable medium of claim 23, wherein the predetermined reference delay time is determined from a plurality of audio samples from a plurality of users.

25. The non-transitory computer-readable medium of claim 23, wherein the delay time is a mean delay time, and the mean delay time is calculated by taking the mean of a plurality of delay times from the plurality of audio samples.

26. The non-transitory computer-readable medium of claim 19, wherein the at least one indicator is determined, by the computing device, based on at least one of a time of day, a geolocation of the computing device, a recency of use by a user of an application associated with the indicator, and a frequency of use by the user of an application associated with the indicator.

* * * * *